J. BOGARDUS.
Soft Rubber-Cutter.
No. 4,280. Patented Nov. 21, 1845.
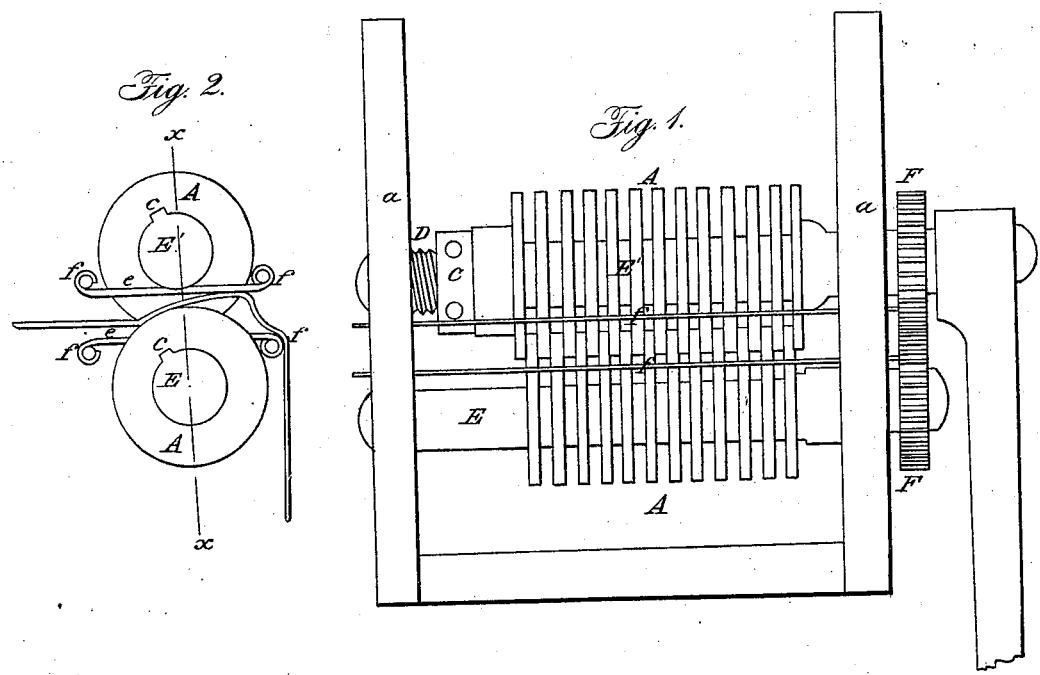
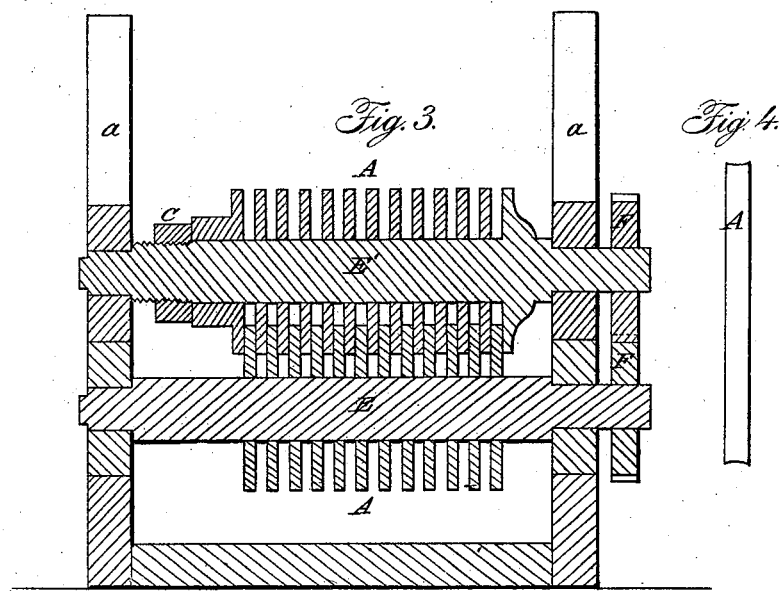

UNITED STATES PATENT OFFICE.

JAMES BOGARDUS, OF NEW YORK, N. Y.

MACHINE FOR CUTTING INDIA-RUBBER INTO SHREDS.

Specification of Letters Patent No. 4,280, dated November 21, 1845; Antedated May 21, 1845.

*To all whom it may concern:*

Be it known that I, JAMES BOGARDUS, of the city, county, and State of New York, have invented a new and useful Machine for Cutting or Slitting India-Rubber into Narrow Strips or Threads, but which is applicable to other purposes, and that the following is a full, clear, and exact description of the principle or character which distinguishes it from all other things before known and of the manner of making, constructing, and using the same, reference being had to the accompanying drawings, making part of this specification, in which—

Figure 1 is a front elevation of the machine; Fig. 2, a cross section thereof, and Fig. 3, a longitudinal section taken at the line (X X) of Fig. 2.

The same letters indicate like parts in all the figures.

In this machine the india rubber or other substance, is slit or cut into threads by the square edges of two series of cutter wheels, arranged on two parallel shafts, the edges of the two series passing between each other so that they shall operate as shears; but the tendency to wear the edges and faces where they come together would very soon render them inefficient and therefore to avoid this difficulty, instead of attaching the cutting wheels to the shafts permanently, they are put on by means of a feather, so as to turn with the shafts and yet slide thereon freely; in this way the edges of the two series, where they pass between each other, can be kept in close contact by the turning of a nut on the end of one of the shafts, for the turning of this nut must of necessity act upon all the wheels of the two series.

In the accompanying drawings (E, E') represent two parallel cylindrical shafts supported in suitable boxes in the standards (a a) of an appropriate frame, and geared together by two spur wheels (F, F) of equal diameter to cause the two shafts to move in opposite directions with equal velocities. Each of these shafts receives a series of circular cutters (A) that slide freely thereon from end to end, but which are caused to rotate with the shaft by means of a feather (c) received in a notch in the wheels in manner well known to mechanics; these circular cutters should in thickness be equal to the width of the intended strips, and of such diameter that those on one shaft shall pass in the spaces between the others. The first of the series on one of the shafts (say the shaft E') is permanent, and the last of that series is forced up toward the rest by a nut (C), tapped on the shaft, by the turning of which all the cutters of the two series are made to hug closely, to insure the contact of the edges in passing, so as to insure the shearing of the india rubber or other substance submitted to their action. The peripheries of these cutter wheels should be hollowed out (as represented at Fig. 4, which is an enlarged view of one of them) to insure a sharp cutting edge.

For the purpose of clearing the strips after they are cut, or discharging them from the spaces between the cutting wheels, wires or strips of metal (e) are placed in the spaces between the cutting wheels, and supported by rods (f, f) placed on each side of and parallel with the shafts.

It will be evident from the foregoing that the same end may be attained by interposing an elastic medium between the cutting wheels in each series, the object of my invention being so to arrange the series of cutting wheels on their shafts as to cause the edges of the two series, where they pass each other to be brought into contact by simply applying pressure to the first in the series by a nut, wedge or other analogous device. And instead of the nut or wedge, a powerful spring may be substituted to keep the cutting edges always in contact provided the strength of the spring be greater than the tendency to separate the cutters.

I am aware that a series of cutters or disks have been secured on a shaft by means of a nut, and therefore I wish it to be distinctly understood that I do not claim this as my invention, but What I do claim as my invention and desire to secure by Letters Patent, is—

The method herein described of adjusting the cutting edges of two series of cutting wheels which fit between each other, by having each series to slide endwise on a shaft so that the edges of the two series can be forced into contact by a nut, wedge, spring, or other analogous device, as herein described.

JAMES BOGARDUS.

Witnesses:
W. B. MACLAY,
ARCHIBALD MACLAY, Jr.